United States Patent [19]

Skillicorn

[11] 3,910,992

[45] Oct. 7, 1975

[54] LIQUID VINYLIDENE-TERMINATED POLYMERS

[75] Inventor: Douglas E. Skillicorn, Avon Lake, Ohio

[73] Assignee: The B. F. Goodrich Company, Akron, Ohio

[22] Filed: Sept. 28, 1972

[21] Appl. No.: 292,926

[52] U.S. Cl. .......... 260/485 G; 260/79.5; 260/82.3; 260/83.5; 260/85.5 ES; 260/89.5; 260/88.3 A; 260/484 P; 260/486 B; 260/589 R; 260/609 R; 260/615 R
[51] Int. Cl.² ........................................ C07C 69/34
[58] Field of Search ......... 260/484 R, 484 P, 484 B, 260/485 G

[56] References Cited
UNITED STATES PATENTS
3,432,478  5/1969  May ..................... 260/485
3,485,732  12/1969  D'Alelio ............... 260/485

Primary Examiner—Robert Gerstl
Assistant Examiner—Paul J. Killos
Attorney, Agent, or Firm—Alan A. Csontos

[57] ABSTRACT

Liquid vinylidene ($CH_2$=C<) terminated polymers are prepared by the reaction of a (1) liquid polymer having a terminal functional group selected from the group consisting of carboxyl, hydroxyl, mercaptan, amine and epoxy and (2) a compound containing both an epoxy group

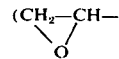

and a vinylidene group. The reaction can be catalyzed using a base. The polymers cure readily to solid elastomers which are useful as sealants, caulks, potting compounds, coatings and the like.

3 Claims, No Drawings

LIQUID VINYLIDENE-TERMINATED POLYMERS

BACKGROUND OF THE INVENTION

Liquid polymers containing vinylidene ($CH_2\!=\!C<$) groups are known. These polymers are prepared in a number of processes such as cleavage or degradation of high molecular weight dienic elastomers (U.S. Pat. No. 3,313,793 and British Pat. No. 1.057,014); the free-radical polymerization of dienic monomers in the presence of large amounts of chain transfer agent; the solution polymerization of dienic monomers using lithium catalysts; and addition methods such as the polyaddition of dithiols with alene (Journal of Polymer Chemistry, Part C, Vol. 24, Page 113 (1968)).

These liquid polymers are cured through the vinylidene groups to solid elastomers. This has advantages in that compounding ingredients may be simply dissolved or dispersed in the polymer by mixing, and the compounded liquid poured or spread into place. Desirably, the compounded liquid will then quickly cure in situ at room temperature or with only slight application of heat. Unfortunately, the vinylidene groups of the previously known polymers are not highly reactive at room temperature. Cure to a dry elastomeric state may often take weeks. This has heretofore hindered or prevented the use of these liquid polymers in applications such as commercial caulks and sealants. Furthermore, most of these liquid polymers have their vinylidene groups pendant to the polymer backbone. This is not favorable for, in the vulcanized state, an optimum balance of tensile strength and extensibility is achieved when the cure sites are located at the terminal ends of the liquid polymer molecule. This disadvantage cannot be readily remedied as most preparation processes allow for little control over the location of the vinylidene group on the molecule. Liquid polymers containing terminal vinylidene groups are desirable, particularly if the vinylidene groups are of high activity that readily react with curing agents at room temperature to form solid elastomer.

SUMMARY OF THE INVENTION

Liquid vinylidene ($CH_2\!=\!C<$) terminated polymers of the structure

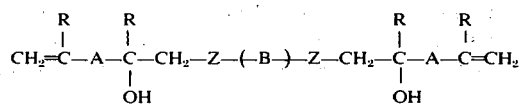

wherein B is a polymeric backbone of carbon-carbon, polyether, or polysulfide linkages; Z is selected from the group consisting of —O—, —S—, —NH—,

and —O—$CH_2$—$CH_2$—; A is a bivalent radical containing 1 to 10 atoms of C, O. S or N; and R is hydrogen or an alkyl radical containing 1 to 4 carbon atoms, cure readily at room temperature to a dry surface. The polymers are prepared by the reaction of (1) a liquid polymer having a terminal functional group selected from the group consisting of carboxyl, hydroxyl, mercaptan, amine and epoxy, and (2) a compound containing both an epoxy

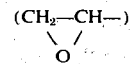

group and a vinylidene group. The reaction can be catalyzed using a base.

DETAILED DESCRIPTION

The novel liquid polymers are characterized by having reactive terminal vinylidene ($CH_2\!=\!C<$) groups. The polymers have a theoretical reactive vinylidene functionality of 2.0; i.e., one reactive vinylidene group at each end of the polymer molecule. However, the novel vinylidene-terminated polymers can be prepared from liquid polymers which have an average functionality of less than 2. Because of this, and also due to incomplete conversions, the novel polymers can have an average reactive vinylidene functionality as low as about 1.2. The liquid polymer reactants used to prepare the novel polymers can also have additional carboxyl, hydroxyl, mercaptan, amine, or epoxy functional groups as pendant groups. When such a polymer reactant is employed, the novel polymers can have more than 2, and up to about 12 reactive vinylidene groups. Therefore, the novel polymers can have an average reactive vinylidene functionality of from about 1.2 to about 12. More preferredly, the novel polymers have an average reactive vinylidene functionality of from about 1.6 to about 4.

The liquid vinylidene-terminated polymers have a molecular weight of from about 1,000 to about 20,000 as measured using a Mechrolab Vapor Pressure Osmometer. The polymers are more conveniently described by their bulk viscosity. The polymers have a bulk viscosity of from about 500 centipoises to about 8,000,000 centipoises (measured at 27°C. using a Brookfield model LVT viscometer with spindle No. 7 at 0.5 to 100 rpm). More preferredly, the polymers have a bulk viscosity from about 5,000 centipoises to about 2,000,000 centipoises. Polymers having a bulk viscosity from about 10,000 centipoises to about 400,000 centipoises are particularly useful in caulk, sealant, and potting compound applications.

The novel polymers are prepared by the reaction of (1) a liquid polymer having from about 1.5 to about 12 functional groups per molecule capable of reacting with an epoxy group, and (2) a compound containing both an epoxy group and a vinylidene group. Liquid polymer reactants having terminal functional groups capable of reacting with an epoxy group include (A) liquid carboxyl-terminated polymers, (B) liquid mercaptan-terminated polymers, (C) liquid hydroxyl-terminated polymers, (D) liquid amine-terminated polymers, and (E) liquid epoxy-terminated polymers. These polymers have molecular weights and bulk viscosities in the same range as described herein for the vinylidene-terminated polymers. The functional group, which can be carboxyl, hydroxyl, mercaptan, amine, or epoxy, comprises from about 0.5 percent to about 10 percent by weight based upon the weight of the polymer. More preferredly, the functional group comprises about 1 percent to about 5 percent by weight of the polymer.

The functionally terminated polymers have polymeric backbones comprising carbon-carbon linkages, polyether linkages, or polysulfide linkages. The polymers having carbon-carbon linkages contain polymerized units of a vinylidene monomer selected from (a) monoolefins containing 2 to about 8 carbon atoms such as ethylene, propylene, isobutylene, 1-butene, 1-pentene, 1-hexene, and the like; (b) dienes containing 4 to about 10 carbon atoms such as butadiene, isoprene, 2-isopropyl-1,3-butadiene, chloroprene, and the like; (c) vinyl aromatics such as styrene, α-methyl styrene, vinyl toluene, and the like; (d) vinyl nitriles such as acrylonitrile, methacrylonitrile, and the like; (e) vinyl and allyl esters such as vinyl acetate, vinyl propionate, allyl acetate, and the like; (f) vinyl and allyl ethers such as vinyl methyl ether, allyl methyl ether, and the like; (g) divinyls and diacrylates such as divinyl benzene, divinyl ether, diethylene glycol diacrylate, and the like; and (h) acrylates of the formula

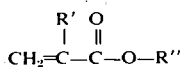

wherein R′ is —H, —CH$_3$ or —C$_2$H$_5$, and R″ is an alkyl radical containing 1 to 18 carbon atoms or an alkoxyalkyl, an alkylthioalkyl, or cyanoalkyl radical containing 2 to about 12 carbon atoms. Examples of such acrylates are ethyl acrylate, butyl acrylate, hexyl acrylate, 2-ethylhexyl acrylate, dodecyl acrylate, octadecyl acrylate, methoxyethyl acrylate, butoxyethyl acrylate, hexyl thioethyl acrylate, β-cyanoethyl acrylate, cyanooctyl acrylate, methyl methacrylate, octyl methacrylate, ethyl ethacrylate, and the like. Often two or more types of polymerized monomeric units are contained in the polymeric backbone.

Examples of liquid carboxyl-terminated polymers are carboxyl-terminated polyethylene, carboxyl-terminated polybutadiene, carboxyl-terminated polyisoprene, carboxyl-terminated poly(butadiene-acrylonitrile), carboxyl-terminated poly(butadiene-styrene), carboxyl-terminated poly(butadiene-acrylonitrile-acrylic acid), carboxyl-terminated poly(ethyl acrylate), carboxyl-terminated poly(ethyl acrylate-n-butyl acrylate), carboxyl-terminated poly(n-butyl acrylate-acrylonitrile), carboxyl-terminated poly(butyl acrylate-styrene), and the like. The polymers can be prepared by free radical polymerization using carboxyl-containing initiators and/or modifiers as disclosed in U.S. Pat. No. 3,285,949 and German Pat. No. 1,150,205, and polymers prepared by solution polymerization using lithium metal or organometallic compounds and post-treating the polymers to form carboxyl groups as disclosed in U.S. Pat. Nos. 3,135,716 and 3,431,235. Liquid carboxyl-terminated polymers as carboxyl-terminated polybutadiene, carboxyl-terminated polybutadiene-acrylonitrile, and carboxyl-terminated polyacrylate were found to be excellent reactants for the preparation of the novel polymers.

Examples of liquid mercaptan-terminated polymers are mercaptan-terminated polybutadiene, mercaptan-terminated polyisoprene, mercaptan-terminated poly(butadiene-acrylonitrile), mercaptan-terminated poly(ethyl acrylate), mercaptan-terminated poly(ethyl acrylate-n-butyl acrylate), mercaptan-terminated poly(ethyl acrylate-n-butyl acrylate-glycidyl acrylate), and the like. The polymers can be prepared by free-radical polymerization of monomers in the presence of dixanthogen disulfide and then post-reacted to form the mercaptan groups as disclosed in U.S. Pat. Nos. 3,449,301 and 3,580,830 and British Pat. No. 859,470. They can also be mercaptan-terminated polyethers as disclosed in Journal of Polymer Science, Vol. 12 (1968), Page 107; and mercaptan-terminated polyalkylene sulfides.

Examples of liquid hydroxyl-terminated polymers are hydroxyl-terminated polyethylene, hydroxyl-terminated polybutadiene, hydroxyl-terminated polyisoprene, hydroxyl-terminated poly(butadiene-acrylonitrile), hydroxyl-terminated poly(acrylates), and the like. The polymers can be prepared by post-reacting carboxyl-terminated polymers as disclosed in U.S. Pat. Nos. 3,551,471 and 3,551,472; by free-radical polymerization of monomers using hydroxyl-containing initiators as in U.S. Pat. No. 2,844,632; and by solution polymerization using lithium or organometallic catalysts and post-reacting the product to form the hydroxyl groups as disclosed in U.S. Pat. Nos. 3,135,716 and 3,431,235.

Examples of liquid amine-terminated polymers are the amine-terminated poly(2-methyl ethoxy) polymers and the glycol polyamines disclosed in U.S. Pat. No. 3,306,809.

Examples of liquid epoxy-terminated polymers are glycidyl ethers of polyhydric alcohols such as glycerol, pentaerithritol, polyvinyl alcohol, 1,3,5-trihydroxybenzene, and the like; the glycidyl ethers of polyhydric phenols such as bisphenol A resins and of phenol-formaldehyde products such as the Novolac resins; and other epoxies as disclosed in U.S. Pat. No. 3,310,601.

The liquid polymer reactants can contain more than one type of functional group. For example, the polymer can have terminal carboxyl groups and internal pendant epoxy groups derived from interpolymerized units of glycidyl acrylate monomer. Or, the polymer can contain terminal mercaptan groups and internal pendant carboxyl groups derived from interpolymerized units of acrylic acid.

The novel liquid vinylidene-terminated polymers are prepared in a process comprising the reaction of a liquid functionally-terminated polymer as described above with a compound containing both an epoxy and a vinylidene group. These compounds have the formula

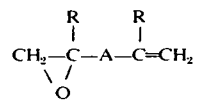

wherein R is hydrogen or an alkyl radical containing 1 to 4 carbon atoms, and A is a bivalent radical containing 1 to about 10 atoms selected from C, O, S and N.

More preferredly, the compound contains a glycidyloxy structure as

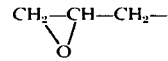

and R is hydrogen or a methyl radical. Examples of the more preferred compounds are isopropenyl glycidyl ether, allyl glycidyl ether, methallyl glycidyl ether, glycidyl acrylate, and glycidyl methacrylate. Most preferred are glycidyl acrylate and glycidyl methacrylate.

The liquid vinylidene-terminated polymers have the structure

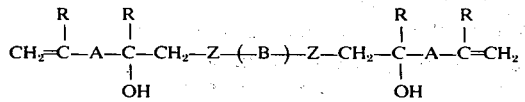

wherein B is a polymeric backbone of carbon-carbon, polyether, or polysulfide linkages; Z is selected from the group consisting of —O—, —S—, —NH—,

and —O—CH$_2$—CH$_2$—; A is a bivalent radical containing 1 to 10 atoms of C, O, S or N; and R is hydrogen or an alkyl radical containing 1 to 4 carbon atoms. The radical Z is the remaining fragment of the hydroxyl group of the hydroxyl-terminated polymer yielding the —O—, the mercaptan group of the mercaptan-terminated polymer yielding the —S—, the amine group of the amine-terminated polymer yielding the —NH—, the carboxyl-group of the carboxyl-terminated polymer yielding the

or the epoxy group of the epoxy-terminated polymer yielding the —O—CH$_2$—CH$_2$—. The radical A originates from the compound containing both the epoxy and the vinylidene group. More preferredly, A is

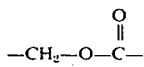

which is derived from the use of glycidyl acrylate or glycidyl methacrylate, —CH$_2$—O—CH$_2$— which is derived from the use of allyl glycidyl ether or methallyl glycidyl ether, or —CH$_2$—O— which is derived from the use of isopropenyl glycidyl ether. The polymeric backbone B originates from the polymeric backbone of the functionally-terminated polmyer reactant.

The liquid carboxyl-terminated polymers were found to be excellent polymer reactants for the reaction. The liquid carboxyl-terminated polymers have an average functionality of from about 1.5 to about 12, and more preferredly from about 1.8 to about 4. The average functionality can be determined by multiplying the molecular weight of the polymer by the equivalent parts per hundred of carboxyl groups. The molecular weight can be measured using a Mechrolab Vapor Pressure Osmometer. The equivalent parts per hundred of carboxyl groups is determined by measuring the weight percent of carboxyl groups in the polymer (by titration of a polymer solution to a phenolphthalein end-point using alcoholic KOH) and dividing the resultant figure by 45, the weight of a carboxyl group (—COOH).

The liquid carboxyl-terminated polymers employed have a molecular weight ranging from about 1,000 to about 20,000 and a bulk viscosity from about 1,000 to about 8,000,000 centipoises, preferably from about 5,000 to 2,000,000 centipoises, measured at 27°C. using a Brookfield LVT Viscometer with spindle No. 7 at 0.5 to 100 rpm.

The carboxyl-terminated polymers are reacted with a compound containing both an epoxy and a vinylidene group, at a range of from about 1 mole to about 3 moles of epoxy to every 1 mole of carboxyl. Use of over 3 moles of epoxy per mole of carboxyl is not necessary to achieve excellent results.

The reaction can be conducted in bulk, preferably employing an excess of the epoxy-vinylidene compound. More preferredly the reaction is conducted in a solvent. The choice of solvent is influenced by the solubility of the liquid functionally-terminated polymer used. Examples of useful solvents are aliphatic hydrocarbons such as heptane, hexane, acetone, methylethyl ketone, isopropyl alcohol, t-butyl alcohol, and the like. Acetone was found to be an excellent solvent for a variety of liquid polymers.

The reaction temperature is from about 0°C. to about 200°C. A more preferred temperature range is from about 50°C. to about 150°C. Total reaction time varies as to the reaction temperature and to the use of a catalyst. A normal reaction time is from about 4 hours to about 24 hours. The reaction is preferredly conducted in the absence of air or oxygen.

The reaction rate between the carboxyl group and the epoxy group can be accelerated by using a base as a catalyst. The base can be an inorganic base such as sodium hydroxide, potassium hydroxide, and metal alcoholates such as sodium ethoxide, potassium butoxide, and the like. More preferredly, the base is a tertiary amine. The tertiary amine can be aliphatic, cyclic methyleneamines, or heterocyclic amines. Examples of these are trimethylamine, triethylamine, triisopropyl amine, dimethylbutyl amine, dimethylbenzyl amine, methyldiphenyl amine, triethanol amine, N-methyl piperidine, N-methyl morpholine, triethylenediamine, pyridine, 4,4'-dipyridyl propane, 2,4,6-tri(dimethylaminomethyl)phenol and the like.

The base is used in a range from about 0.05 to about 2 parts by weight based on 100 parts by weight of the liquid functionally-terminated polymer reactant. More preferredly, the base is used at a level from about 0.1 part to 1 part by weight.

The vinylidene-terminated polymers can be isolated by direct drying under reduced pressure or by coagulation. If a base catalyst is employed, typically an acid, such as hydrochloric acid, is added to neutralize the base prior to recovery. The solution can be coagulated using water, lower alkyl alcohol, or an alcohol/water solution. The polymer is then normally washed with water and dried under reduced pressure.

The liquid vinylidene-terminated polymers prepared from the carboxyl-terminated polymers have Z equal to

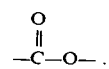

If glycidyl acrylate or glycidyl methacrylate is reacted with the carboxyl-terminated polymer the radical A is

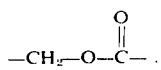

Of course, the polymeric backbone B is the same as in the carboxyl-terminated reactant.

The liquid polymers have highly reactive terminal vinylidene groups. Therefore, preferredly, they are admixed with an antioxidant to hinder premature air-oxidation. The antioxidant is used in a range from about 0.1 to about 5 parts by weight per 100 parts by weight of polymer. The antioxidants are typical antioxidants such as phenyl-β-naphthylamine, di-β-naphthyl-p-phenylenediamine, 2,6-di-t-butyl paracresol, 2,4,6-trihexyl phenol, 1,3,5-tris(3,5-di-t-butyl-4-hydroxybenzyl)isocyanurate, and other useful phenolic antioxidants disclosed in U.S. Pat. No. 3,157,517.

The vinylidene-terminated polymers are cured to solid elastomers using known curatives for unsaturated liquid polymers. The curvatives include unsaturated rubber curatives such as sulfur, sulfur donors, tetramethylthiuram disulfide, tetramethylene guanidine, and the like. Because of the high activity of the vinylidene groups, the polymers can readily cure at room temperature to a dry surface using di- and polythiols and primary and secondary di- and polyamines. Examples of the thiols are dimercaptans such as 1,4-butane dithiol, 1,7-heptane dithiol, and the like, and thioglycolates and mercaptopropionates such as ethylene glycol bis(thioglycolate), trimethyl propane tris(thioglycolate), pentaerythritol tetrakis(thioglycolate), ethylene glycol bis(mercaptopropionate), trimethylol propane tris(mercaptopropionate), pentaerythritol tetrakis(mercaptopropionate), and the like, and other thiols disclosed in U.S. Pat. Nos. 3,310,601 and 3,662,023.

Preferredly, the thiol type curatives are used with tertiary amines as catalysts. Examples of the tertiary amines are trimethyl amine, triethyl amine, N,N-dimethylethyl amine, N,N-dimethyl aniline, triphenyl amine, N-methyl piperidine, triethylene diamine, 4,4'-dipyridyl propane, 2,4,6-tri(dimethylaminomethyl)-phenol, and the like.

Examples of primary and secondary di- and polyamine curatives are ethylenediamine, trimethylenediamine, tetramethylenediamine, pentamethylenediamine, hexamethylenediamine, 1,3-diaminocyclohexane, m-phenylenediamine, bis(hexamethylene)triamine, triethylene tetraamine, hexamethylene tetraamine, tricretonylidene tetraamine, and the like.

The thiol and amine curatives are used in a range from about 0.1 to about 20 parts by weight per 100 parts by weight of the vinylidene-terminated polymer, and more preferably from about 0.2 to about 10 parts by weight. If a tertiary amine cure catalyst is employed, the range of use is from about 0.01 to about 3 parts by weight per 100 parts of polymer.

Many other compounding ingredients can be used with the liquid polymers. Such ingredients include fillers such as clays, silicas, carbon blacks, resins, asbestos, and the like; plasticizers and extenders such as diisobutyl oleate, diisooctyl sebacate, dibenzyl phthalate, ASTM oils, glycerin, and the like; antioxidants and stabilizers; pigments such as $TiO_2$ iron oxide, chromium oxide, and the like; and tackifiers, waxes, fungicides, and the like.

The curatives and compounding ingredients can be admixed with the liquid vinylidene-terminated polymers using internal mixers such as Henschel mixers and extruders or using ink mill rolls, and using standard mixing techniques.

The liquid polymers can be poured into place, spread into place with a spatula or knife-edge, or forced into place using a caulk gun or the like. The polymer cures quickly at room temperature, yielding an elastomer having a dry surface. The liquid vinylidene-terminated polymers are useful for preparing caulks and sealants for filling cracks and crevices, joints between brick, concrete slabs, glass, and the like; potting compounds for imbedding wires and electrical components; flow-in-place gaskets; and protective coatings for metal, concrete, and the like.

The following Examples serve to more fully illustrate the invention. Ingredients are given in parts by weight unless otherwise indicated.

EXAMPLE I

Liquid carboxyl-terminated polybutadiene polymers were prepared following the procedure given in U.S. Pat. No. 3,285,949. The polymers had the following properties:

| Polymer | Bulk Viscosity cps at 27°C. | Weight Percent Carboxyl Content |
|---|---|---|
| A | 41,400 | 1.98 |
| B | 34,000 | 2.20 |

The polymers were used to prepare liquid vinylidene-terminated polymers. The recipes used and polymer data were as follows:

| | 1 | 2 | 3 | 4 | 5 | 6 | 7 |
|---|---|---|---|---|---|---|---|
| Polymer A | 100 | 100 | 100 | 100 | — | — | — |
| Polymer B | — | — | — | — | 100 | 100 | 100 |
| Acetone | 64 | 64 | 64 | 64 | — | 64 | 64 |
| Toluene | — | — | — | — | 100 | — | — |
| Glycidyl acrylate | 8.1 | 8.1 | — | 8.1 | 9.0 | 9.0 | 9.0 |
| Allyl glycidyl ether | — | — | 7.3 | — | — | — | — |
| Trimethyl amine, milliliters[1] | — | 0.8 | 0.8 | 0.8 | — | 0.8 | 0.8 |
| DMP-30[2], parts | — | — | — | — | 1.0 | — | — |
| Temperature, °C. | 95 | 95 | 95 | 95 | 80–95 | 95 | 95 |
| Time, hours | 12 | 12 | 12 | 12 | 16 | 12 | 8 |
| Vinylidene polymer, bulk viscosity cps at 27°C. | 23,400 | 111,800 | 24,000 | 62,400 | 1,800,000 | 188,000 | 392,000 |
| Residual weight percent carboxyl content | 1.45 | 0.02 | 0.27 | 0.14 | 0.09 | 0.14 | 0.29 |
| Percent carboxyl reacted | 27 | 99 | 86 | 95 | 96 | 94 | 87 |

[1] 25% by weight in methanol
[2] 2,4,6-tri(dimethylaminomethyl) phenol

The polymer, solvent, and glycidyl acrylate or allyl glycidyl ether were placed in a glass reactor vessel. About 0.5 part by weight based upon the weight of the polymer of hydroquinone was added to hinder crosslinking reactions. The amine catalyst was then added and the vessels agitated for the times and at the temperatures indicated. After reaction, about 0.5 milliliters of concentrated hydrochloric acid was added to neutralize the amine catalyst. The vinylidene-terminated polymers were isolated by direct drying under reduced pressure.

Sample 1 used no amine catalyst. The carboxyl reacted, but the other samples demonstrate the accelerated reaction rate obtained by using a base catalyst. The Example shows the preparation of the vinylidene-terminated polymers and shows that high conversions are readily obtained.

EXAMPLE II

The liquid vinylidene-terminated polybutadiene polymers prepared in Example I were cured using the following recipes:

terminated polymer from which the vinylidene-terminated polybutadiene was prepared. The sample shows that no cure took place, even though the polymer is highly unsaturated and contains pendant vinyl structure as the result of polymerization of the 1,3-butadiene. The quick, dry cure is achieved only through the reactive vinylidene groups.

Sample 14 was also evaluated by pouring it into a tensile sheet mold and letting it set for 7 days at room temperature. The cured tensile sheet was removed and tested for tensile, elongation, and hardness following ASTM D412 and ASTM D676 - Durometer A. The polymer had a 110 psig tensile, a 500 percent elongation, and a Durometer A hardness of 18.

EXAMPLE III

The liquid vinylidene-terminated polymers of the invention have highly reactive vinylidene groups. In Example II, the control sample, a liquid carboxyl-terminated polybutadiene polymer did not cure in 10 days even though the polymer contains vinyl configuration as the result of polymerized 1,3-butadiene. Other

| | 1 | 2 | 3 | 4 | 5 | 6 | 7 | 8 | 9 | 10 | 11 | 12 | 13 | 14 | Control[3] |
|---|---|---|---|---|---|---|---|---|---|---|---|---|---|---|---|
| Polymer 1 | 100 | — | — | — | — | — | — | — | — | — | — | — | — | — | — |
| Polymer 2 | — | 100 | — | — | — | — | — | — | — | — | — | — | — | — | — |
| Polymer 4 | — | — | 100 | — | — | — | — | — | — | 100 | 100 | 100 | 100 | 100 | — |
| Polymer 6 | — | — | — | 100 | 100 | 100 | 100 | — | — | — | — | — | — | — | — |
| Polymer 7 | — | — | — | — | — | — | — | 100 | 100 | — | — | — | — | — | — |
| Ethylenediamine | 1.5 | 1.5 | 1.5 | 1.5 | 1.1 | — | — | — | 1.5 | — | — | — | — | — | 1.5 |
| Triethylene tetraamine | — | — | — | — | 0.9 | — | — | — | — | — | — | — | — | — | — |
| 1,6-hexane diamine | — | — | — | — | — | — | — | 2.6 | — | — | — | — | — | — | — |
| Tetramethylene guanidine | — | — | — | — | — | — | — | — | — | — | — | — | 6 | — | — |
| Mercaptate P-33[1] | — | — | — | — | — | 8.2 | 8.2 | — | — | 4.5 | — | — | — | 4.5 | — |
| Methyl tuads[2] | — | — | — | — | — | — | — | — | — | — | 2.5 | — | — | — | — |
| Sulfur | — | — | — | — | — | — | — | — | — | — | — | 5 | — | — | — |
| Zinc oxide | — | — | — | — | — | — | — | — | — | — | — | 5 | — | — | — |
| DMP-30 | — | — | — | — | — | — | 1.0 | — | — | 2.0 | — | — | — | — | — |
| Room temperature cure | | | | | | | | | | | | | | | |
| Days | 7 | 7 | 10 | 1 | 1 | 7 | 7 | 4 | 1 | 7 | — | — | 7 | 7 | 10 |
| Hardness, Duro A | — | — | 23 | 18 | 21 | — | — | 31 | 15 | 6 | — | — | — | 8 | No |
| Percent elongation | 40 | 1000 | 275 | 400 | 200 | 450 | 175 | 225 | 500 | 350 | — | — | 900 | 550 | Cure |
| 16 hours at 105°C. | | | | | | | | | | | | | | | |
| Hardness, Duro A | — | — | — | — | — | — | — | — | — | 16 | 2 | 1 | 1 | — | — |
| Percent Elongation | — | — | — | — | — | — | — | — | — | 200 | 800 | 400 | 800 | — | — |

[1]Trimethylolpropane tris(mercaptopropionate)
[2]Tetramethylthriuram disulfide
[3]Carboxyl-terminated polybutadiene used in Example I, 100 parts by weight The curatives were added to the liquid vinylidene-terminated polymers and the mix stirred to achieve uniform distribution. The mixes were then poured into molds and let stand at room temperature to cure. Samples 10 to 13 also were also at elevated temperatures. All of the cured samples had dry surfaces. The control sample was an attempt at curing the carboxyl-liquid polymers having pendant vinyl configuration were also evaluated. The recipes are as follows:

| | 1 | 2 | 3 | 4 | 5 | 6 | 7 | 8 | 9 | 10 |
|---|---|---|---|---|---|---|---|---|---|---|
| Polymer 4[1] | 100 | — | — | — | — | — | — | — | — | — |
| Polymer 6[1] | — | 100 | — | — | — | 100 | — | — | — | — |
| Hstyl B-1000[2] | — | — | 100 | — | — | — | — | — | — | — |
| Hstyl B-2000[3] | — | — | — | — | — | — | 100 | 100 | — | — |
| Hycar 1312[4] | — | — | — | 100 | 100 | — | — | — | 100 | 100 |
| Ethylenediamine | — | — | — | — | — | 1.5 | 5.0 | 15.0 | 4.25 | 8.6 |
| Mercaptate P-33 | 4.5 | 8.2 | 31.3 | 16.0 | 47.0 | — | — | — | — | — |
| DMP-30 | 2.0 | 1.0 | 4.0 | 2.0 | 5.7 | — | — | — | — | — |
| Room temperature cure | | | | | | | | | | |
| Days | 7 | 7 | 7 | 7 | 7 | 1 | 7 | 7 | 7 | 7 |
| Hardness, Duro A | 6 | — | No | No | No | 18 | No | No | No | No |
| Percent elongation | 350 | 175 | Cure | Cure | Cure | 400 | Cure | Cure | Cure | Cure |
| 16 hours at 105°C. | | | | | | | | | | |
| Hardness, Duro A | 16 | — | No | No | No | — | No | No | No | No |
| Percent elongation | 200 | — | Cure | Cure | Cure | — | Cure | Cure | Cure | Cure |

[1]polymers from Example I
[2]Liquid polybutadiene polymer having a molecular weight of about 1200 and about a 90% by weight vinyl configuration
[3]Liquid polybutadiene polymer having a molecular weight of about 2100 and about a 91% by weight vinyl configuration
[4]Liquid poly(butadiene-acrylonitrile) polymer having about a 32% by weight acrylonitrile content and about a 20% by weight vinyl configuration Samples 1, 2 and 6 were prepared using the novel vinylidene-terminated polymers. The remaining samples were prepared using liquid polymers having a high degree of vinyl-configuration unsaturation. Only the novel polymers cured at room temperature and at elevated temperature, even though high levels of curatives were employed with the other polymers. The Example demonstrates that the vinylidene groups of the liquid polymers of the invention are much more reactive than either main polymer chain unsaturation or pendant vinyl unsaturation.

EXAMPLE IV

A liquid carboxyl-terminated poly(butadiene-acrylonitrile) polymer was prepared following the procedure in U.S. Pat. No. 3,285,949. The acrylonitrile range of these polymers is from about 1 percent to about 40 percent by weight based upon the weight of the polymer, and more preferably is from about 10 percent to about 30 percent by weight. The butadiene content ranges from about 50 percent to about 98 percent by weight and the carboxyl content from about 0.5 percent to about 10 percent by weight, all weights based upon the total weight of the polymer. The prepared polymer had a bulk viscosity at 27°C. of 112,000, a 2.52 percent by weight carboxyl content, and a 18.2 percent by weight acrylonitrile content. The polymer was used to prepare a liquid vinylidene-terminated poly(butadiene-acrylonitrile)polymer. The recipe used and data was as follows:

| | |
|---|---|
| Carboxyl polymer | 100 |
| Acetone | 64 |
| Glycidyl acrylate | 10.3 |
| Trimethyl amine, milliliters | 0.8 |
| Temperature, °C. | 95 |
| Time, hours | 12 |
| Vinylidene polymer, bulk viscosity, cps at 27°C. | 300,000 |
| Residual Carboxyl content, weight percent | 0.14 |

The vinylidene polymer was prepared following the procedure given in Example I. The polymer was cured using the following recipes. All samples had a dry surface.

| | 1 | 2 | 3 |
|---|---|---|---|
| Vinylidene polymer | 100 | 100 | 100 |
| Ethylenediamine | | 1.7 | 1.25 |
| Triethylene tetraamine | 0.4 | | 1.0 |
| Room temperature cure | | | |
| Days | 1 | 1 | 1 |
| Hardness, Duro A | 1 | 27 | 30 |
| Elongation, percent | 400 | 100 | 125 |

EXAMPLE V

Liquid carboxyl-terminated polyacrylate polymers were prepared following the procedure given in U.S. Pat. No. 3,465,058. The polymers made had the following properties:

| Polymer | Bulk Viscosity cps at 27°C. | Weight Percent Carboxyl content |
|---|---|---|
| A | 24,000 | 1.71 |
| B | 20,000 | 2.47 |
| C | 141,000 | 3.11 |

Polymers A and B are poly(n-butyl acrylate) polymers, and polymer C is a poly(98 percent n-butyl acrylate-2 percent acrylic acid) polymer.

The polymers were used to prepare liquid vinylidene-terminated polyacrylate polymers. The procedure used follows that given in Example I. The recipes used and the data obtained are as follows:

| | 1 | 2 | 3 |
|---|---|---|---|
| Polymer A | 100 | — | — |
| Polymer B | — | 100 | — |
| Polymer C | — | — | 40 |
| Acetone | 64 | — | 25.6 |
| Glycidyl acrylate | 7.8 | 8.8 | 5.0 |
| Trimethyl amine, milliliters | 0.8 | — | 0.35 |
| DMP-30, milliliters | — | 1.0 | — |
| Temperature, °C. | 95 | 105 | 95 |
| Time, hours | 12 | 16 | 12 |
| Vinylidene polymer, bulk viscosity, cps at 27°C. | 63,000 | — | 279,200 |
| Residual carboxyl content weight percent | 0.14 | — | 0.63 |
| Percent carboxyl conversion | 92 | — | 80 |

The polymers were cured using the following recipes:

| | | | |
|---|---|---|---|
| Sample 2 | 100 | — | — |
| Sample 3 | — | 100 | — |
| Control[1] | — | — | 100 |
| Ethylenediamine | — | 2.4 | — |
| Triethylene tetraamine | — | — | 0.6 |
| Room temperature cure | | | |
| days | 1 | 10 | 10 |
| Hardness, Duro A | — | 17 | no |
| Elongation, percent | 200 | 75 | cure |

[1]carboxyl-terminated poly(n-butyl acrylate-ethyl acrylate-acrylic acid)

EXAMPLE VI

A liquid vinylidene-terminated polyether polymer was prepared from a liquid amine-terminated polyether. The amine-terminated polyether has the formula

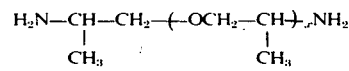

wherein $x$ is from about 5 to 40. The polymer had a value of $x$ of about 30, a bulk viscosity at 27°C. of 236 cps., and a weight percent nitrogen content of 1.4 percent. The polymer was reacted at 100 parts by weight with 51.8 parts by weight of glycidyl acrylate in 100 parts by weight of acetone, following the procedure given in Example I. The liquid vinylidene-terminated polyether polymer had a bulk viscosity at 27°C. of 500 cps. The vinylidene polymer was mixed at 100 parts by weight with 3.5 parts by weight of ethylenediamine. After 10 days at room temperature, the mix was a solid elastomer having a Duro A hardness of 5 and a 30 percent elongation.

The liquid vinylidene polymers prepared from the amine-terminated polymers have the formula

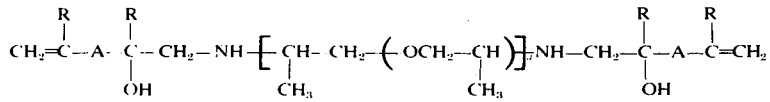

wherein R is defined as above and $x$ is from 5 to about 40. The polymer prepared in the example has A equal to

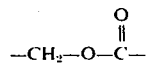

and $x$ equal to 30.

I claim:

1. A liquid vinylidene-terminated polymer having a molecular weight of from about 1,000 to about 20,000 of the structure

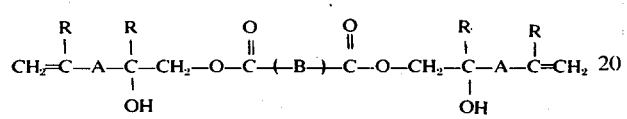

wherein B is a polymeric backbone of carbon-carbon linkages and consisting of polymerized units of dienes containing 4 to about 10 carbon atoms; A is selected from the group consisting of $$-CH_2OC-;$$
$$\quad\quad\|$$
$$\quad\quad O$$

$-CH_2OCH_2-$, and $-CH_2O-$; and R is hydrogen or an alkyl radical containing 1 to 4 carbon atoms.

2. A liquid vinylidene-terminated polymer of claim 1 having a molecular weight from about 1,000 to about 20,000 of the structure

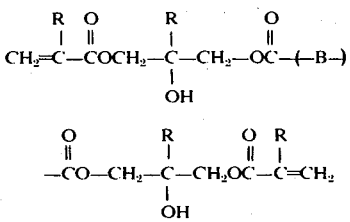

wherein B is a polymeric backbone consisting of carbon-carbon linkages derived from interpolymerized units of a diene monomer containing 4 to about 10 carbon atoms, and R is hydrogen or an alkyl radical containing 1 to 4 carbon atoms.

3. A polymer of claim 2 wherein the diene monomer is 1,3-butadiene and R is hydrogen or a methyl radical.

* * * * *